US012592253B2

(12) United States Patent
Xu et al.

(10) Patent No.: US 12,592,253 B2
(45) Date of Patent: ***Mar. 31, 2026

(54) TAPERED BI-LAYER NEAR FIELD TRANSDUCER FOR HEAT-ASSISTED MAGNETIC RECORDING WRITE HEADS

(71) Applicant: Headway Technologies, Inc., Milpitas, CA (US)

(72) Inventors: Weihao Xu, San Jose, CA (US); Tobias Maletzky, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,395

(22) Filed: May 15, 2024

(65) Prior Publication Data

US 2024/0296866 A1 Sep. 5, 2024

Related U.S. Application Data

(63) Continuation of application No. 18/106,609, filed on Feb. 7, 2023, now Pat. No. 12,014,758.

(51) Int. Cl.
| | |
|---|---|
| *G11B 5/60* | (2006.01) |
| *G11B 5/31* | (2006.01) |
| *G11B 13/08* | (2006.01) |
| *G11B 5/00* | (2006.01) |

(52) U.S. Cl.
CPC ............ *G11B 5/6088* (2013.01); *G11B 5/314* (2013.01); *G11B 13/08* (2013.01); *G11B 2005/0021* (2013.01)

(58) Field of Classification Search
CPC ....... G11B 5/6088; G11B 5/314; G11B 13/08; G11B 2005/0021; G11B 5/1278; G11B 5/3116; G11B 5/3163
USPC ......................................................... 216/22
See application file for complete search history.

(56) References Cited

U.S. PATENT DOCUMENTS

| | | | |
|---|---|---|---|
| 9,786,311 | B2 | 10/2017 | Chen |
| 9,852,752 | B1 | 12/2017 | Chou et al. |
| 10,262,683 | B2 | 4/2019 | Staffaroni et al. |
| 10,332,553 | B1 | 6/2019 | Staffaroni et al. |
| 10,636,442 | B2 | 4/2020 | Matsumoto et al. |
| | | (Continued) | |

OTHER PUBLICATIONS

Office Action in U.S. Appl. No. 18/106,609, dated Oct. 30, 2023.
Notice of Allowance in U.S. Appl. No. 18/106,609, dated Feb. 21, 2024.

*Primary Examiner* — Duy Vu N Deo
(74) *Attorney, Agent, or Firm* — DLA Piper LLP (US)

(57) ABSTRACT

The present embodiments relate to a heat-assisted magnetic recording (HAMR) write head with a NFT bi-layer structure with a bottom taper, which can be applied to one or both layers of the two layers. A heat-assisted magnetic recording (HAMR) write head can include a main pole including a tip portion configured to interact with a magnetic recording medium at an air-bearing surface (ABS). The HAMR write head can further include a near-field transducer (NFT) that includes a dielectric waveguide, a plasmon generator (PG) layer, and a second layer. The second layer can include a thermo-mechanically stable material disposed adjacent to the PG layer. Further, the PG layer and the second layer can form a taper angle relative to the ABS ranging between 30 and 60 degrees.

13 Claims, 18 Drawing Sheets

(56) References Cited

U.S. PATENT DOCUMENTS

| 11,626,137 | B1 * | 4/2023 | Fan | G11B 5/02 |
| | | | | 369/13.33 |
| 12,014,758 | B1 * | 6/2024 | Xu | G11B 5/3116 |
| 2012/0181181 | A1 * | 7/2012 | Cheng | G11B 5/1278 |
| | | | | 205/122 |
| 2017/0323659 | A1 * | 11/2017 | Matsumoto | G11B 5/3116 |
| 2020/0273711 | A1 * | 8/2020 | Yoshida | H01L 21/31111 |

* cited by examiner

400

408

ABS

Waveguide

402

404

406

TAPERED BI-LAYER NEAR FIELD TRANSDUCER FOR HEAT-ASSISTED MAGNETIC RECORDING WRITE HEADS

CROSS REFERENCE TO RELATED APPLICATIONS

This application is a continuation of U.S. application Ser. No. 18/106,609, filed Feb. 7, 2023, the entire disclosure of which is hereby incorporated by reference.

TECHNICAL FIELD

Embodiments of the invention relate to the field of electro-mechanical data storage devices. More particularly, embodiments of the invention relate to heat-assisted magnetic recording (HAMR) write head structures as part of a hard disk drive (HDD).

BACKGROUND

A magnetic recording medium (e.g., a magnetic disk) can store magnetic bits representing digital data. A magneto-resistive writer can be part of a hard disk drive (HDD) to write digital data to the magnetic recording medium.

As an overall amount of digital data being stored on HDD devices increases, there is an increasing demand for increased data capacity of HDD devices. One technique to increase data capacity for an HDD can include heat-assisted magnetic recording (HAMR). HAMR techniques increase the density of HDDs by applying heat to a portion of the magnetic recording medium, which can enhance write performance of the write head to the magnetic recording medium.

SUMMARY

The present embodiments relate to a heat-assisted magnetic recording (HAMR) write head with a NFT bi-layer structure with a bottom taper, which can be applied to one or both layers of the two layers. In a first example embodiment, a heat-assisted magnetic recording (HAMR) write head is provided. The HAMR write head can include a main pole including a tip portion configured to interact with a magnetic recording medium at an air-bearing surface (ABS). The HAMR write head can further include a near-field transducer (NFT) that includes a dielectric waveguide, a plasmon generator (PG) layer, and a second layer. The second layer can include a thermo-mechanically stable material disposed adjacent to the PG layer. Further, the PG layer and the second layer can form a taper angle relative to the ABS ranging between 30 and 60 degrees.

In some instances, the PG layer comprises gold.

In some instances, the thermo-mechanically stable material comprises any of Rhodium, Iridium, and platinum.

In some instances, the HAMR write head is formed via a manufacturing process. The manufacturing process can include depositing an alumina layer over the dielectric waveguide. The process can also include adding a first photo-resist (PR) mask over a portion of the alumina layer and performing an ion beam etching (IBE) process to remove another portion of the alumina layer not covered by the first PR mask. The first PR mask can then be removed.

In some instances, the manufacturing process can also include depositing the PG layer over the alumina layer. The process can also include removing a portion of the PG layer via an etching process. The process can also include depos-iting the second layer over the alumina layer and a remaining portion of the PG layer. The process can also include adding a second PR mask over the second layer. The process can also include performing the etching process to remove parts of the second layer, PG layer, and the alumina layer not over the second PR mask. The second PR mask can also be removed.

In some instances, the manufacturing process further comprises depositing a silicon dioxide ($SiO_2$) layer over the second layer, PG layer, and the alumina layer. The process can also include coating a third PR mask over the $SiO_2$ layer performing a reactive-ion etching (RIE) process to remove a portion of the $SiO_2$ layer not under the third PR mask. The process can further include depositing a heat sink and depositing the main pole.

In some instances, the manufacturing process further comprises depositing a RIE stopper layer between the alumina layer and the PG layer. The process can also include performing a RIE process to taper the PG layer and the second layer.

In another example embodiment, a method for manufacturing a heat-assisted magnetic recording (HAMR) write head is provided. The method can include forming a near-field transducer (NFT) by depositing a plasmon generator (PG) layer over an alumina layer that is disposed adjacent to a dielectric waveguide. Forming the NFT can also include depositing a second layer comprising a thermo-mechanically stable material above the PG layer. The PG layer and the second layer can form a taper angle relative to an air-bearing surface (ABS) ranging between 30 and 60 degrees. The method can also include depositing a heat sink above the NFT. The method can also include depositing a main pole adjacent to the heat sink.

In some instances, the PG layer comprises gold.

In some instances, the thermo-mechanically stable material comprises any of Rhodium, Iridium, and platinum.

In some instances, the method can also include depositing the alumina layer over the dielectric waveguide, adding a first photo-resist (PR) mask over a portion of the alumina layer, performing an ion beam etching (IBE) process to remove another portion of the alumina layer not covered by the first PR mask, and removing the first PR mask.

In some instances, the method can also include removing a portion of the PG layer via an etching process, adding a second PR mask over the second layer, performing the etching process to remove parts of the second layer, PG layer, and the alumina layer not over the second PR mask, and removing the second PR mask.

In some instances, the method can also include depositing a silicon dioxide ($SiO_2$) layer over the second layer, PG layer, and the alumina layer, coating a third PR mask over the $SiO_2$ layer, and performing a reactive-ion etching (RIE) process to remove a portion of the $SiO_2$ layer not under the third PR mask.

In some instances, the method can also include depositing a RIE stopper layer between the alumina layer and the PG layer, and performing a RIE process to taper the PG layer and the second layer.

In another example embodiment, a device is provided. The device can include a main pole, a heat sink disposed adjacent to the main pole, and a dielectric waveguide. The device can also include a plasmon generator (PG) layer comprising gold and a second layer comprising a thermo-mechanically stable material disposed above the plasmon generator layer. The thermo-mechanically stable material can include any of: Rhodium, Iridium, and Platinum. Further, any of the plasmon generator and the second layer can form a taper angle relative to an air-bearing surface (ABS) ranging between 30 and 60 degrees.

In some instances, the second layer comprises a peg region adjacent to the ABS with a thickness of the peg region of around 25 nanometers.

In some instances, the device can include an alumina layer disposed between the PG layer and the dielectric waveguide.

In some instances, the device is formed via a manufacturing process comprising adding a first photo-resist (PR) mask over a portion of the alumina layer, performing an ion beam etching (IBE) process to remove another portion of the alumina layer not covered by the first PR mask, and removing the first PR mask.

In some instances, the manufacturing process further comprises depositing the PG layer over the alumina layer, removing a portion of the PG layer via an etching process, depositing the second layer over the alumina layer and a remaining portion of the PG layer, adding a second PR mask over the second layer, performing the etching process to remove parts of the second layer, PG layer, and the alumina layer not over the second PR mask, and removing the second PR mask.

In some instances, the manufacturing process further comprises depositing a silicon dioxide ($SiO_2$) layer over the second layer, PG layer, and the alumina layer, coating a third PR mask over the $SiO_2$ layer, performing a reactive-ion etching (RIE) process to remove a portion of the $SiO_2$ layer not under the third PR mask, depositing the heat sink, and depositing the main pole.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A disk drive can include a write head to interact with a magnetic recording medium to read and write digital data to the magnetic recording medium. As the amount of digital data is required to be stored increases and with an increase in data aerial density of HDD writing, both the write head and digital data written to the magnetic recording medium can be made smaller.

In many instances, to increase data storage capacity for a disk drive, various techniques, such as heat-assisted magnetic recording (HAMR), can be implemented. HAMR-based write heads can heat a portion of a magnetic recording medium, thereby increasing data storage density of the magnetic recording medium. For example, HAMR-based write heads can enable recording at 1~10 Tb/inch2 data density. Utilizing the temperature dependence of coercivity, HAMR can convert optical power into localized heating in a magnetic recording medium to temporarily reduce the switching field needed to align the magnetizations of the medium grains. Sharp thermal gradients, which can translate into high magnetic gradients, can enable a higher data storage density than achievable with the many magnetic recording technologies. Since the heat spot size can be much smaller than the diffraction limit of light, plasmonic structures, also called near field transducers (NFT), can be used to deliver the desired confinement of the optical heating.

One of the biggest challenges in HAMR recording is to improve the reliability of the recording head due to the high operation temperature during HAMR recording, which is around the Curie temperature of FePt (~420° C.). In many cases, a Self-Aligned gold-rhodium (Au—Rh) bi-layer structure can be utilized, which can combine good optical properties in the bottom layer and robust materials in the top layer like Pt, Rh and Ir. The bottom layer can serve as a plasmon generator transferring the light power from the waveguide mode into the plasmon mode while the top layer, which acts as an antenna at the ABS transferring the power into the medium, is more reliable under the high temperature ABS-environments during the HAMR writing process.

Figure 1:
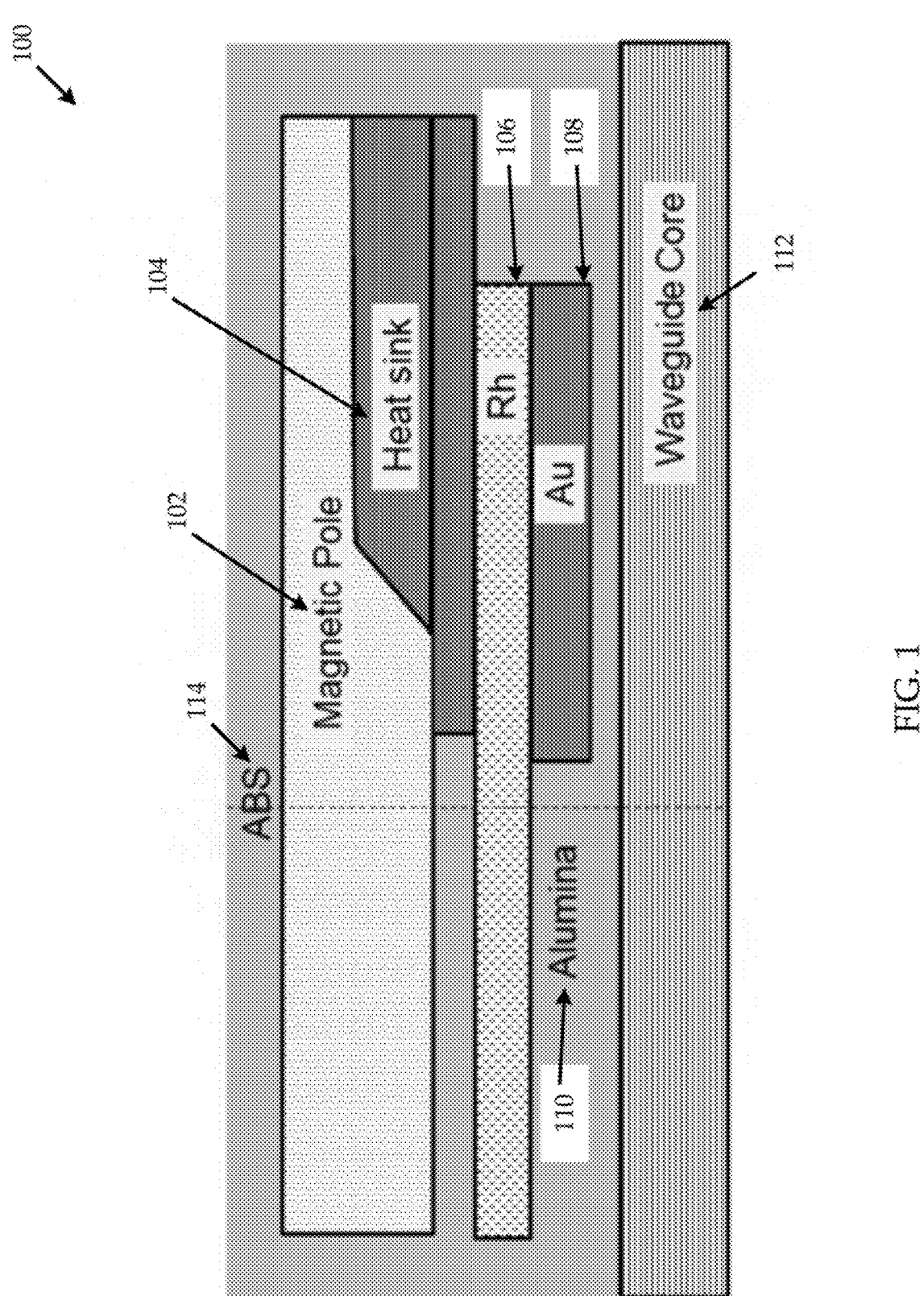
FIG. 1 is a cross-section view of an example write head with a self-aligned Au—Rh bi-layer structure according to an embodiment.

FIG. 1 is a cross-section view of an example write head 100 with a self-aligned Au—Rh bi-layer structure. As shown in FIG. 1, the write head can include a magnetic pole 102 (or main pole (MP) 102). The main pole 102 can obtain an electrical current and generate a magnetic field for interacting with a magnetic recording medium as described herein. A heat sink 104 can be disposed adjacent to the main pole 102. Further, the write head 100 can include a Rh layer 106 and an Au layer 108. An alumina layer 110 can be disposed between the Au layer 108 and a waveguide 112.

Figure 2:
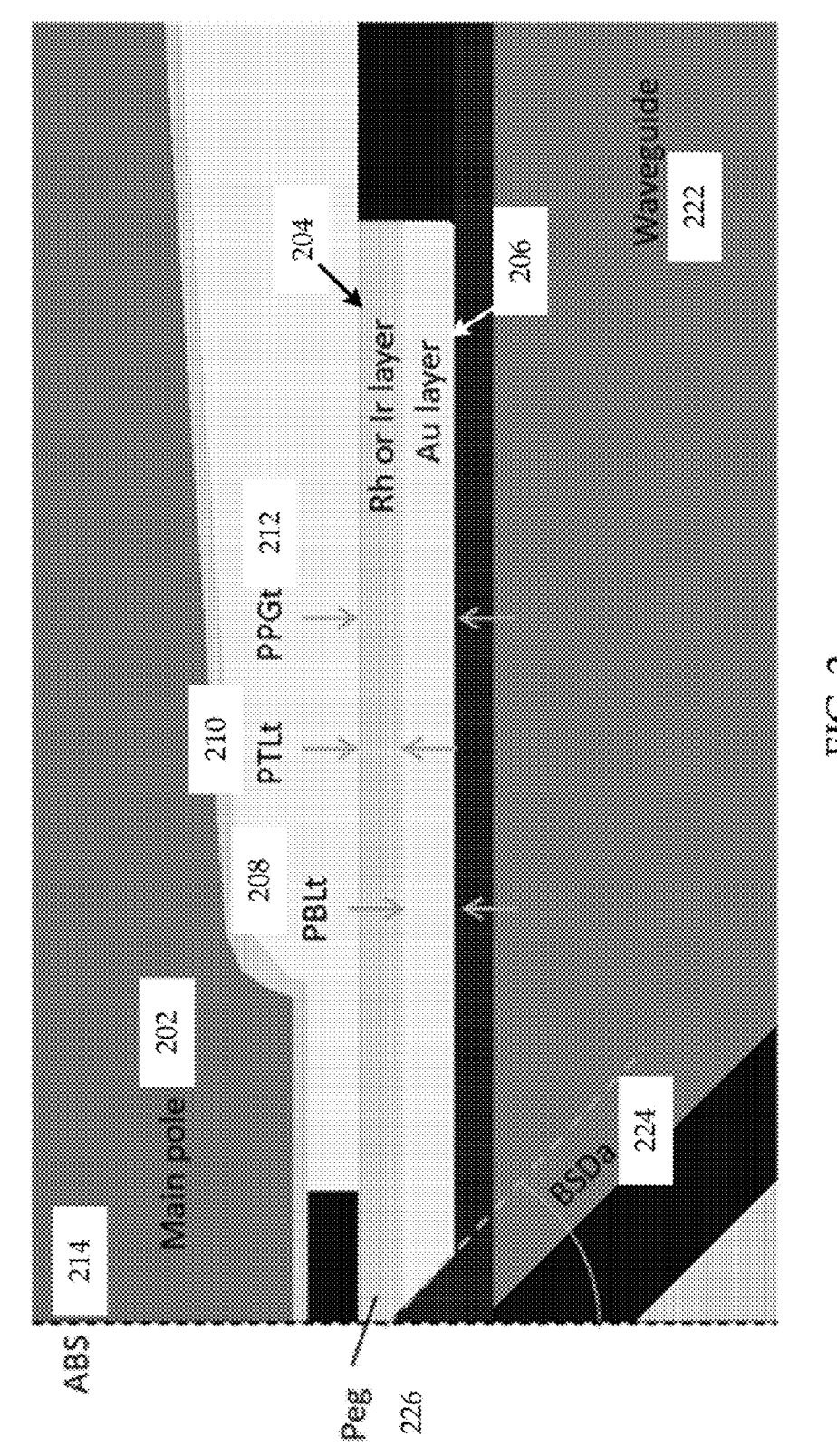
FIG. 2 is a cross-section view of an example write head according to an embodiment.

The present embodiments relate to a Near Field Transducer (NFT) for use in a HAMR system, that can include a first portion (e.g., a plasmon generator) that includes an Au layer fabricated adjacent to a dielectric waveguide with a taper angle of around between 30°~60° and a second portion made of a highly thermo-mechanically stable material such as Rh, Ir, Pt, etc., disposed above the Au plasmon generator layer, which can continue the taper from the first layer (e.g., BSDa 224 in FIG. 2). The second layer can include a PEG region with small cross-track and down-track dimension at the Air Bearing Surface (ABS). This structure can include the combination of the tapered NFT with the bi-layer structure for an improved performance and reliability.

In many cases, various systems can describe a bottom taper, but the whole plasmon generator may consist of only one material, such as Au. Further, a HAMR plasmon generator structure in many cases can include an Au plasmonic bottom layer (PBL) and a Rh top layer, however, there may be no taper angle, neither on the Au PBL layer nor on the Rh layer (FIG. 1). The structure as described in the present embodiment can include taper angles on the PBL and PTL layers, which can improve writer performance and reliability.

An example write head structure can be shown in FIG. 2. In comparison to the structure as described in FIG. 1, the structure in FIG. 2 can include a tapered plasmon generator and peg near the ABS instead of a step. While the step in many cases can be tied to the Au—Rh interface, the taper in FIG. 2 can cross both layers. This can allow for reducing the PEG temperature while maintaining the performance. This can be shown in FIG. 3, which can show the dependence on the top layer thickness (PBLt) at constant total plasmon generator thickness (PPGt=80 nm) despite the smaller PEG thickness at the ABS of 25 nm of the structure in FIG. 2 compared to the 30 nm thick PEG of other structures, the PEG temperature (FIG. 3B) is lower for all investigated cases. The ADC (FIG. 3A) can be similar or even better, if the top layer, which consists of the poorer plasmonic but more stable material (Rh here), fills less than 35 nm of the total plasmon generator thickness of 80 nm. The efficiency (FIG. 3C) can be better than that of other structures for top layer thickness smaller than 50 nm, i.e., an Au bottom layer thickness larger than 30 nm.

FIG. 2 is a cross-section view of an example write head 200. As shown in FIG. 2, the write head 200 can include a main pole 202 and a bi-layer structure including an Rh or Ir layer 204 (which can include PEG 226) and an Au layer 206. A thickness of the bi-layer structure can include PPGt 212, a thickness of the Rh or Ir layer 204 can include a PPG top layer thickness (PTLt) 210, and a thickness of the Au layer can include PPG bottom layer thickness (PBLt) 208. An angle or taper of layers 204, 206 from the ABS 214 can be formed as shown by BSDa 224.

The large opening angle near the hottest region of the plasmon generator, which can include the PEG at the ABS, can allow for a more effective heat transfer from the PEG into the PPG body, which can result in a cooler PEG, less PEG deformation and consequently a better head lifetime. One additional failure mechanism in many HAMR heads can include the recession of the Au bottom layer. The recession can start from the bottom tip of the Au layer near the ABS. The taper as described herein can increase the angle inside the Au bottom layer at this position from ~90° in other structures to 90°+BSDa in the structures as described herein. Although this can decrease, the angle at the interface between the Au and the Ir/Rh top layer near the ABS, Au recession can be reduced, as the adhesion between Au and the Rh/Ir can be much better than the adhesion between Au and the dielectric.

Figures 3A, 3B, 3C:
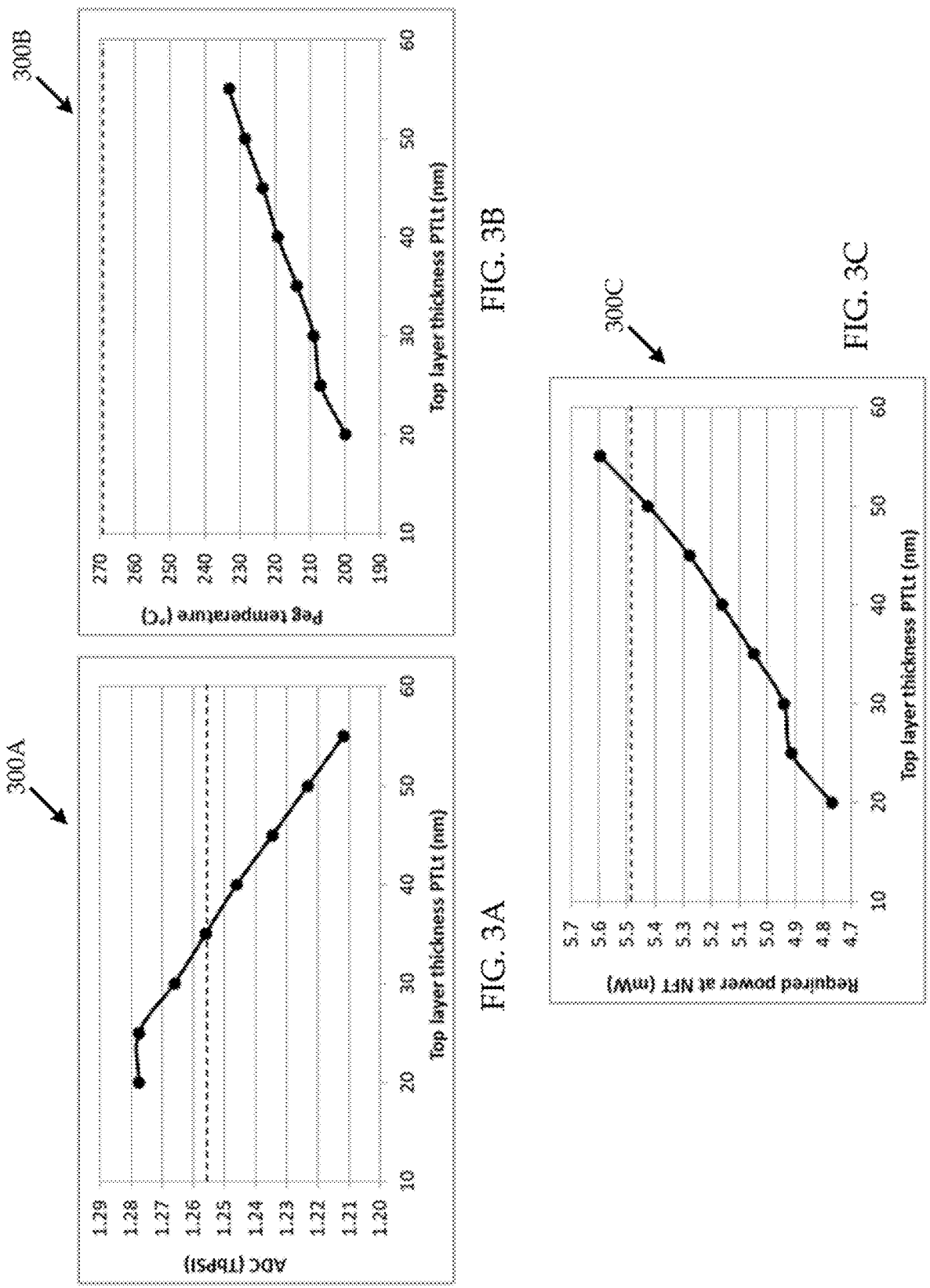
FIG. 3A is a graphical illustration of a correlation between top layer thickness and an ADC according to an embodiment.
FIG. 3B is a graphical illustration of a correlation between top layer thickness and a PEG temperature according to an embodiment.
FIG. 3C is a graphical illustration of a correlation between top layer thickness and a required power at the NFT according to an embodiment.

FIGS. 3A-C illustrate graphical representations of various characteristics of a write head as a thickness of a top layer (e.g., PTLt) changes. FIG. 3A is a graphical illustration 300a of a correlation between top layer thickness and an ADC. FIG. 3B is a graphical illustration 300b of a correlation between top layer thickness and a PEG temperature. FIG. 3C is a graphical illustration 300c of a correlation between top layer thickness and a required power at the NFT.

The overall plasmon generator thickness (PPGt) may be held constant. The dashed lines can indicate the values of other write head structures. Both designs were simulated with the same PEG width and at the same track pitch of 726 kilo track per inch (KTPI). The PEG thickness at the ABS may include 25 nm in case of the bottom tapered design as described herein and 30 nm in other structures.

Figure 4:
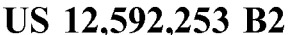
FIG. 4 is a first illustration of an example NFT part of a write head structure according to an embodiment.

FIGS. 4-18 provide illustrations of a structure as part of a fabrication process for the NFT as described herein. FIG. 4 is a first illustration 400 of an example NFT part of a write head structure. As shown in FIG. 4, an alumina layer 408 can be disposed above a waveguide 402. The waveguide can include a first thickness (e.g., between around 10-20 nm) 404 and a second thickness (e.g., of around 500 nm) 406. The alumina layer (or ALD) 408 can be deposited on top of the waveguide 402 after a WvG CMP process.

Figure 5:
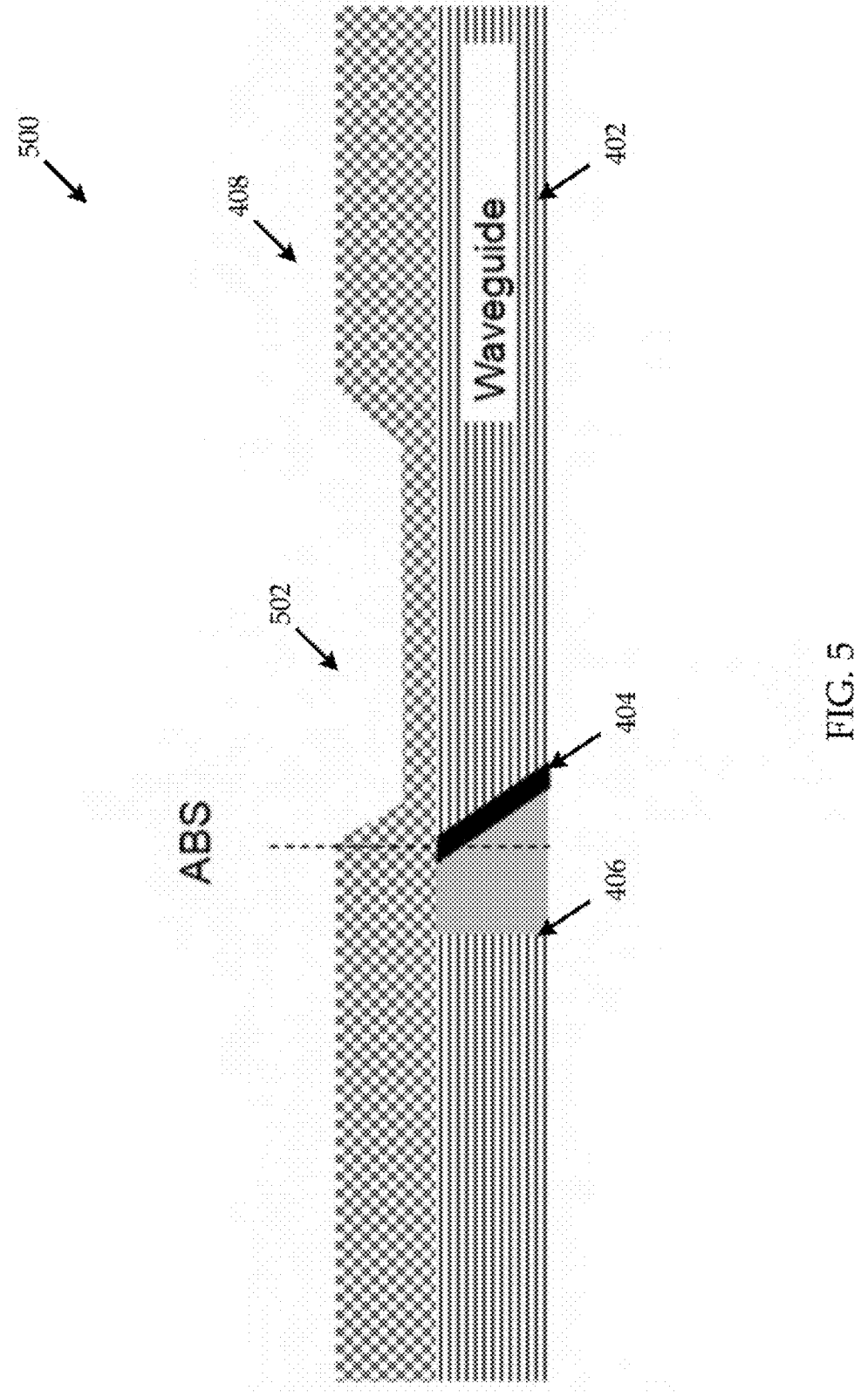
FIG. 5 is a second illustration of an example NFT part of a write head structure according to an embodiment.

FIG. 5 is a second illustration 500 of an example NFT part of a write head structure. A Photo resist (PR) can be coated on part of the alumina layer 408, which can define the shape of the opening. Further, an etching process (ion beam etching (IBE)) can be applied to remove a portion (e.g., 502) of the alumina layer 408 not protected by the mask. The resist mask can then be stripped. The alumina layer 408 wall angle (e.g., an angle of the removed portion 502 of the alumina layer 408) can vary between 0° and 60°. The tip position relative to the ABS can be in the range of 0~60 nm. The etch depth can be about 30~60 nm.

Figure 6:
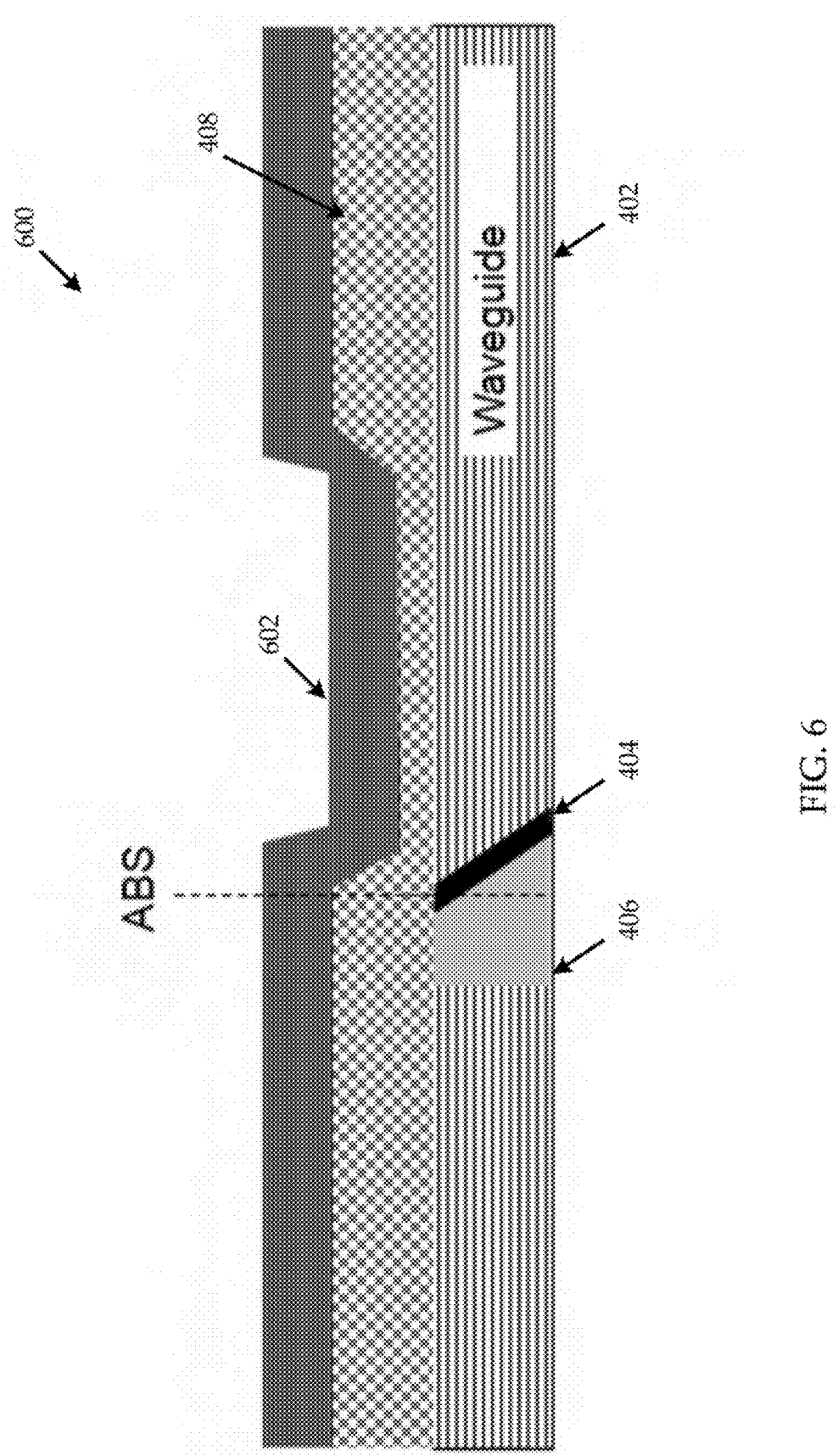
FIG. 6 is a third illustration of an example NFT part of a write head structure according to an embodiment.

FIG. 6 is a third illustration 600 of an example NFT part of a write head structure. As shown in FIG. 6, a full Au-film 602 can be deposited on top of the alumina layer 408.

Figure 7:
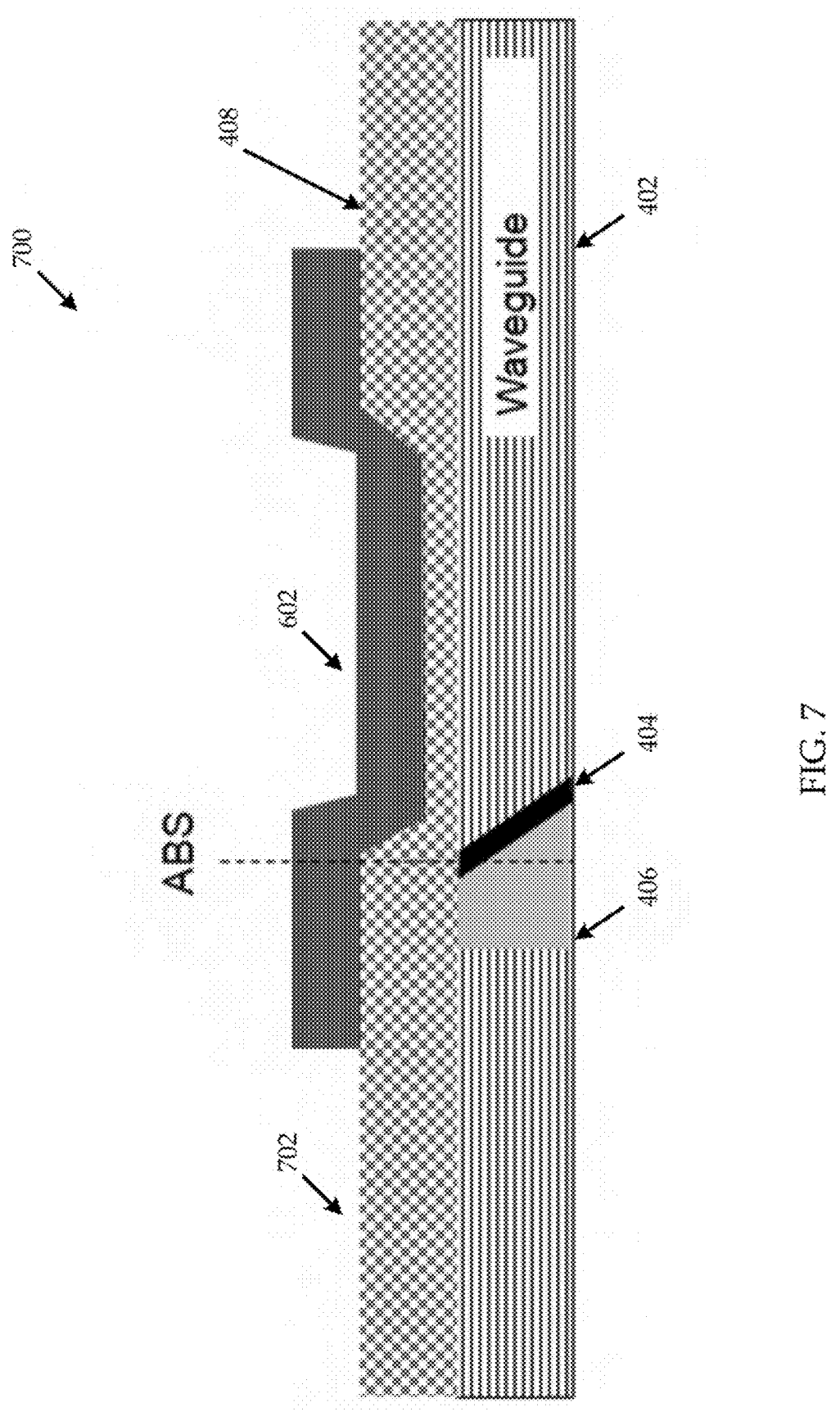
FIG. 7 is a fourth illustration of an example NFT part of a write head structure according to an embodiment.

FIG. 7 is a fourth illustration 700 of an example NFT part of a write head structure. In FIG. 7, a portion of the Au-film 602 can be removed (e.g., as shown in removed portion 702).

Figure 8:
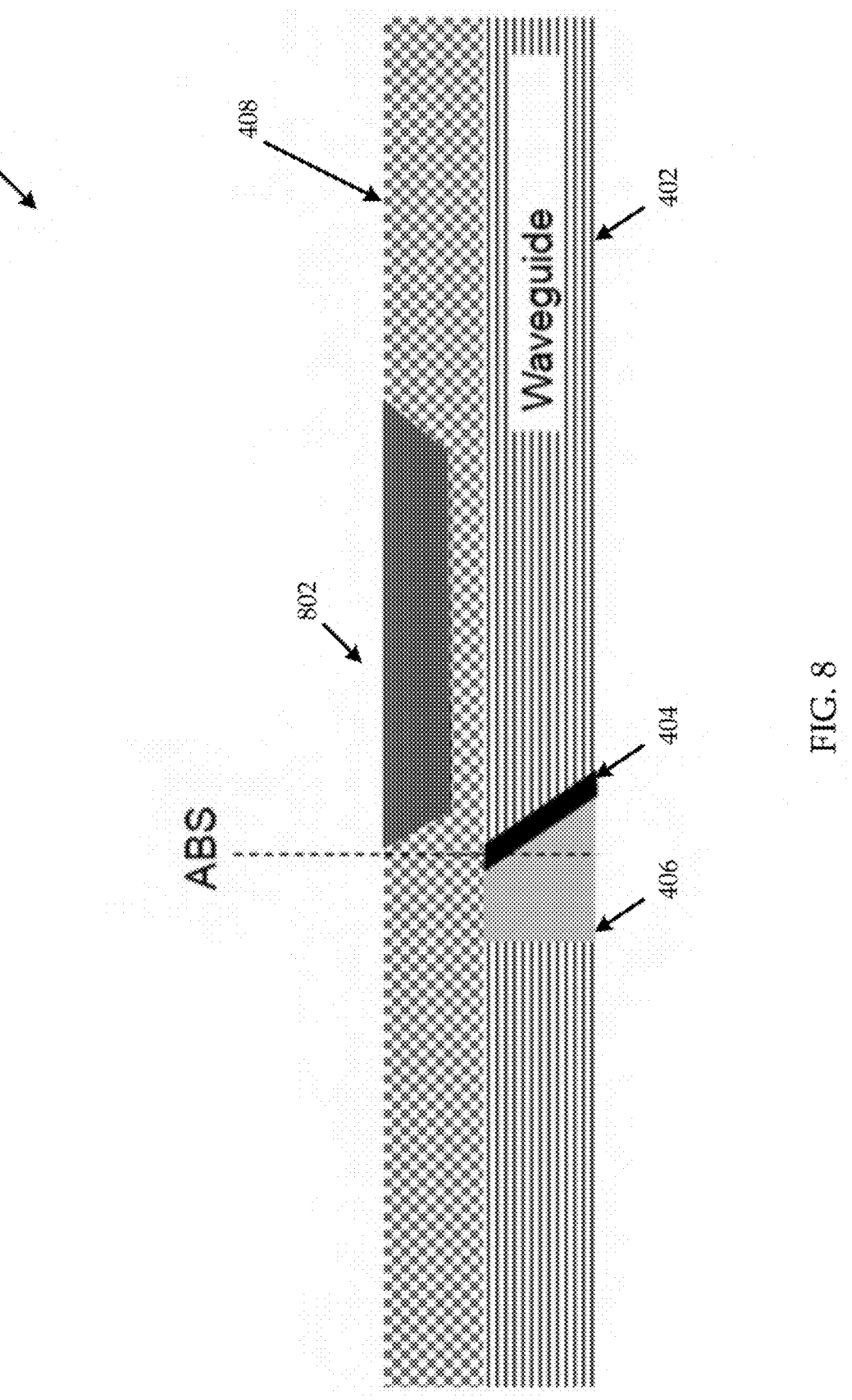
FIG. 8 is a fifth illustration of an example NFT part of a write head structure according to an embodiment.

FIG. 8 is a fifth illustration 800 of an example NFT part of a write head structure. In FIG. 8, the Au-film can be etched to include only a remaining portion of the film 802. A portion of the film can be removed to achieve a flat surface with the alumina layer 408 via any of a $SiO_2$ deposition process, a CMP process, and an IBE process.

Figure 9:
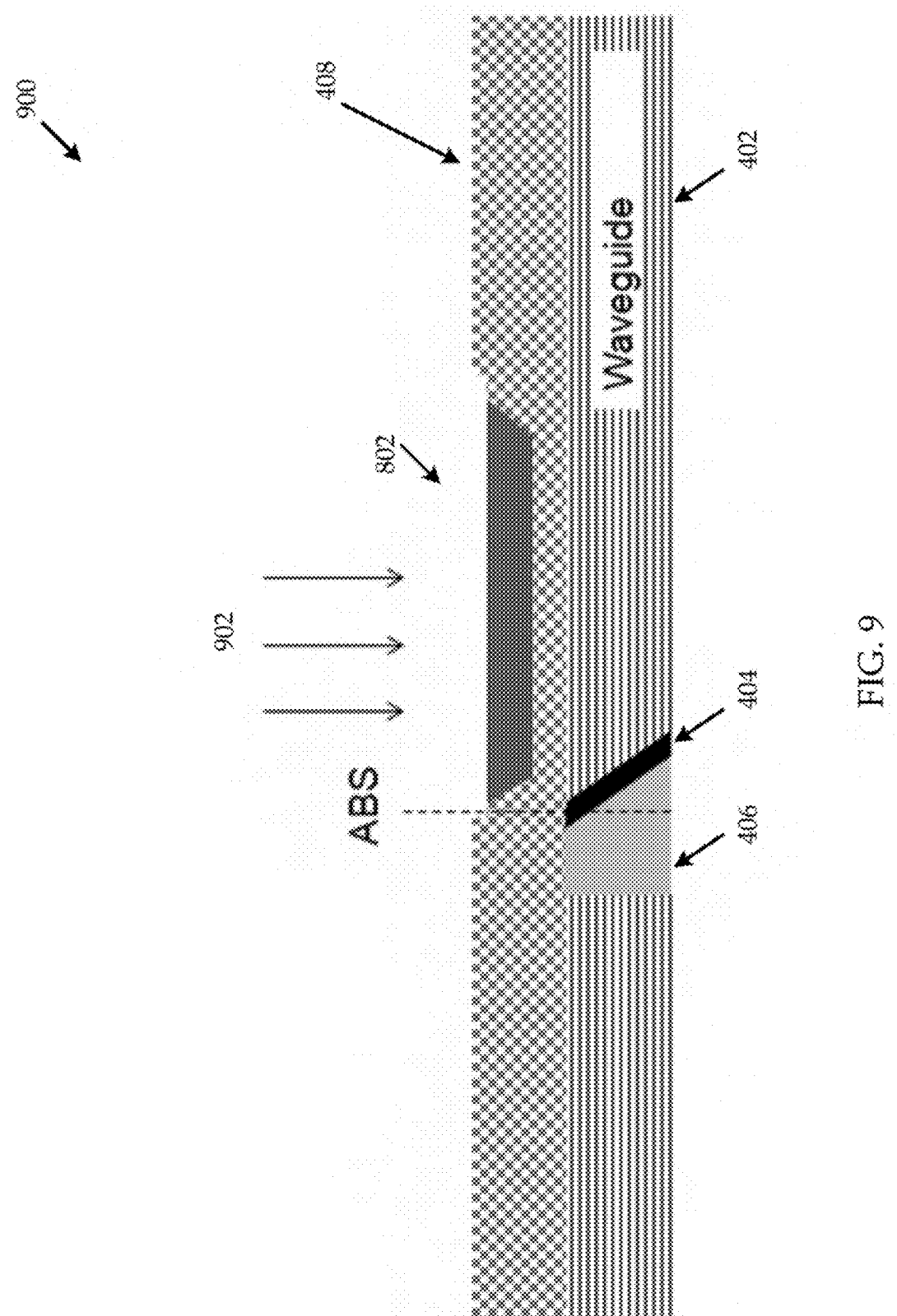
FIG. 9 is a sixth illustration of an example NFT part of a write head structure according to an embodiment.

FIG. 9 is a sixth illustration 900 of an example NFT part of a write head structure. In FIG. 9, a vertical IBE process (e.g., applied in direction 902) can be applied after an Au CMP process. The IBE process can be applied to adjust the remaining Au (e.g., 802) thickness. Due to the IBE rate difference between Au and alumina, Au 802 can be recessed compared to the alumina 408 surface. The IBE amount can range from about 0 to 200 A.

Figure 10:
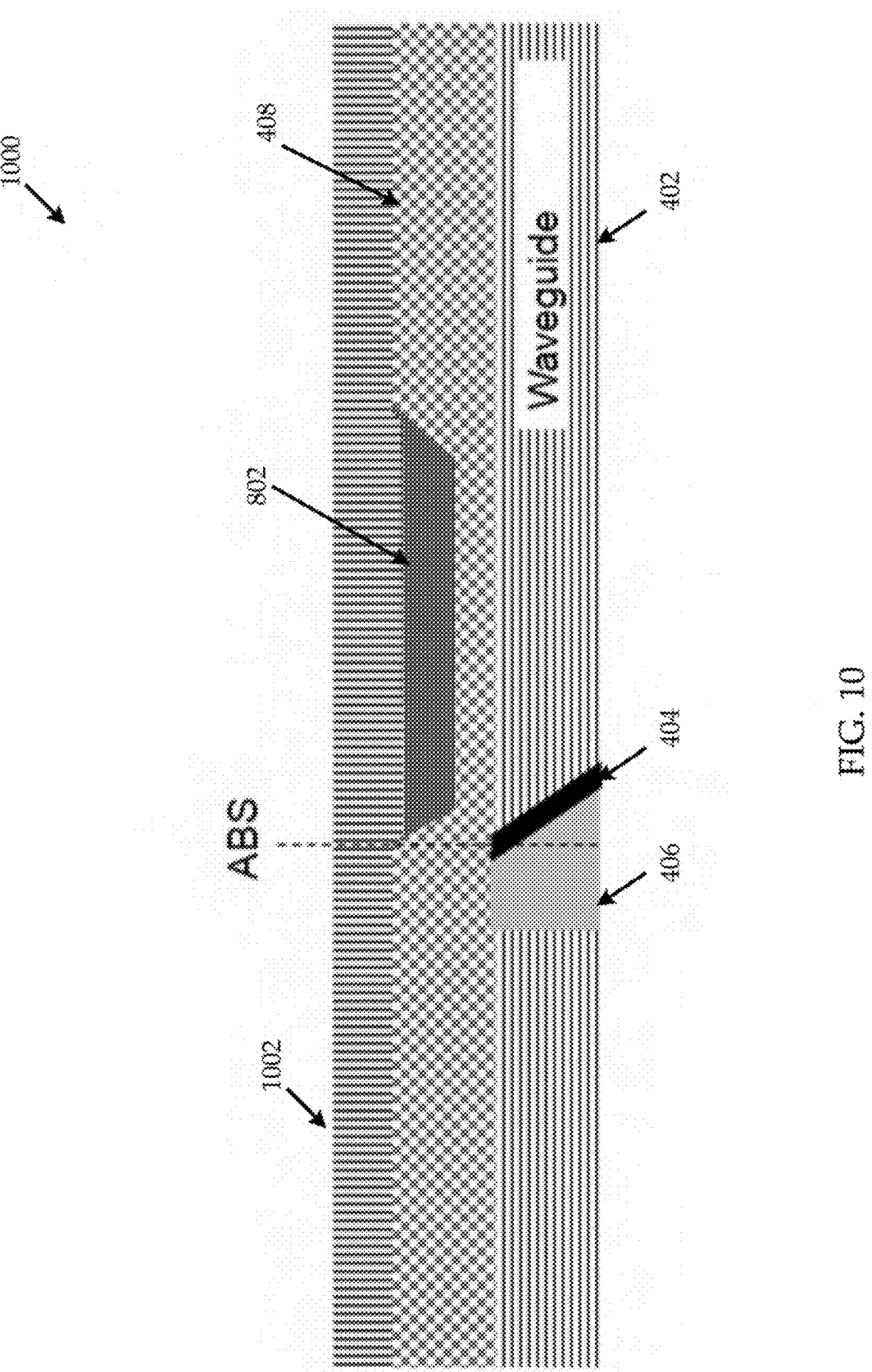
FIG. 10 is a seventh illustration of an example NFT part of a write head structure according to an embodiment.

FIG. 10 is a seventh illustration 1000 of an example NFT part of a write head structure. As shown in FIG. 10, a full Rh film 1002 can be disposed above the alumina layer 408 and the Au layer 802. If a previous IBE amount is 0, it can show a flat Rh profile.

Figure 11:
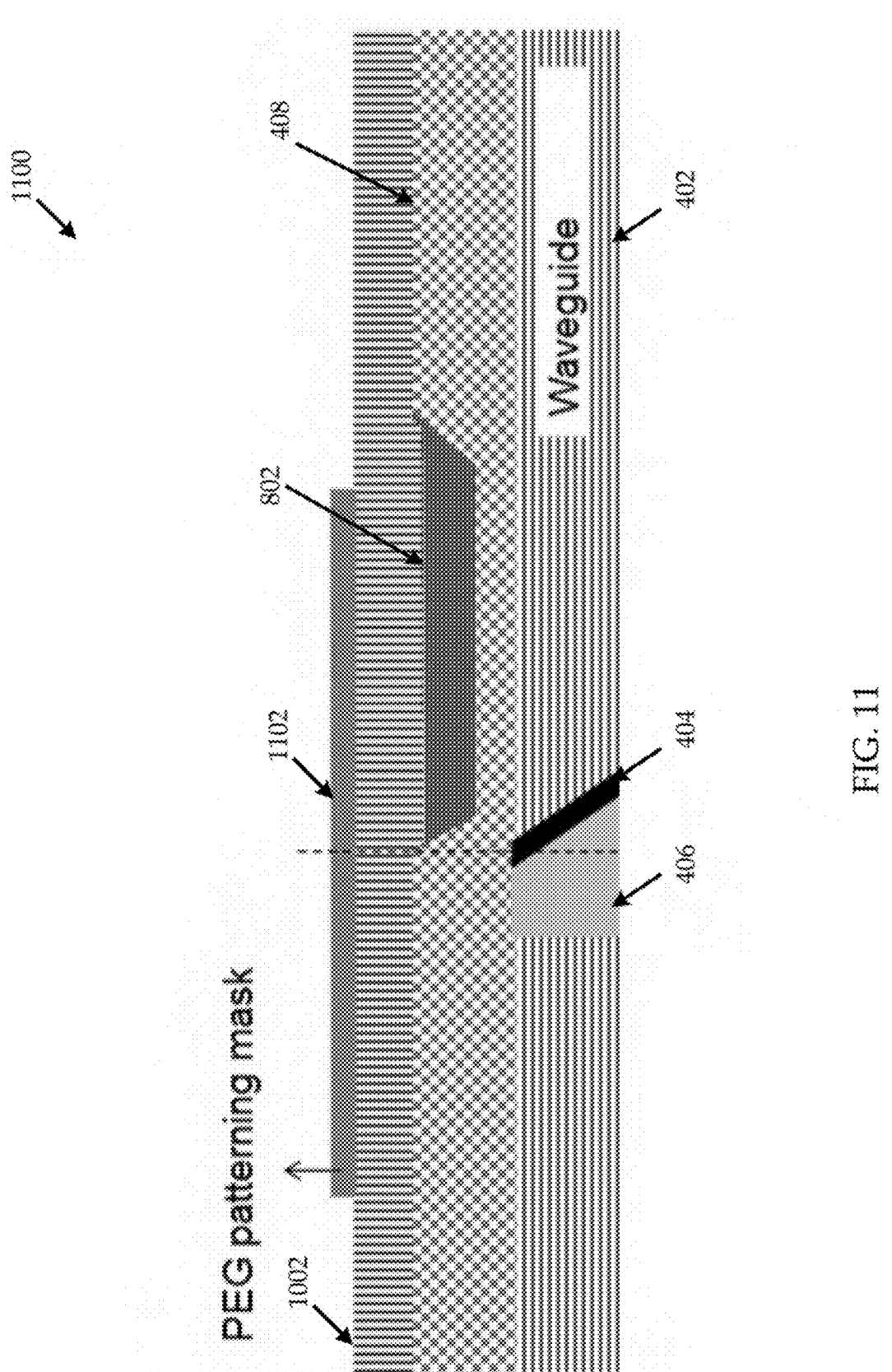
FIG. 11 is an eighth illustration of an example NFT part of a write head structure according to an embodiment.
Figure 12:
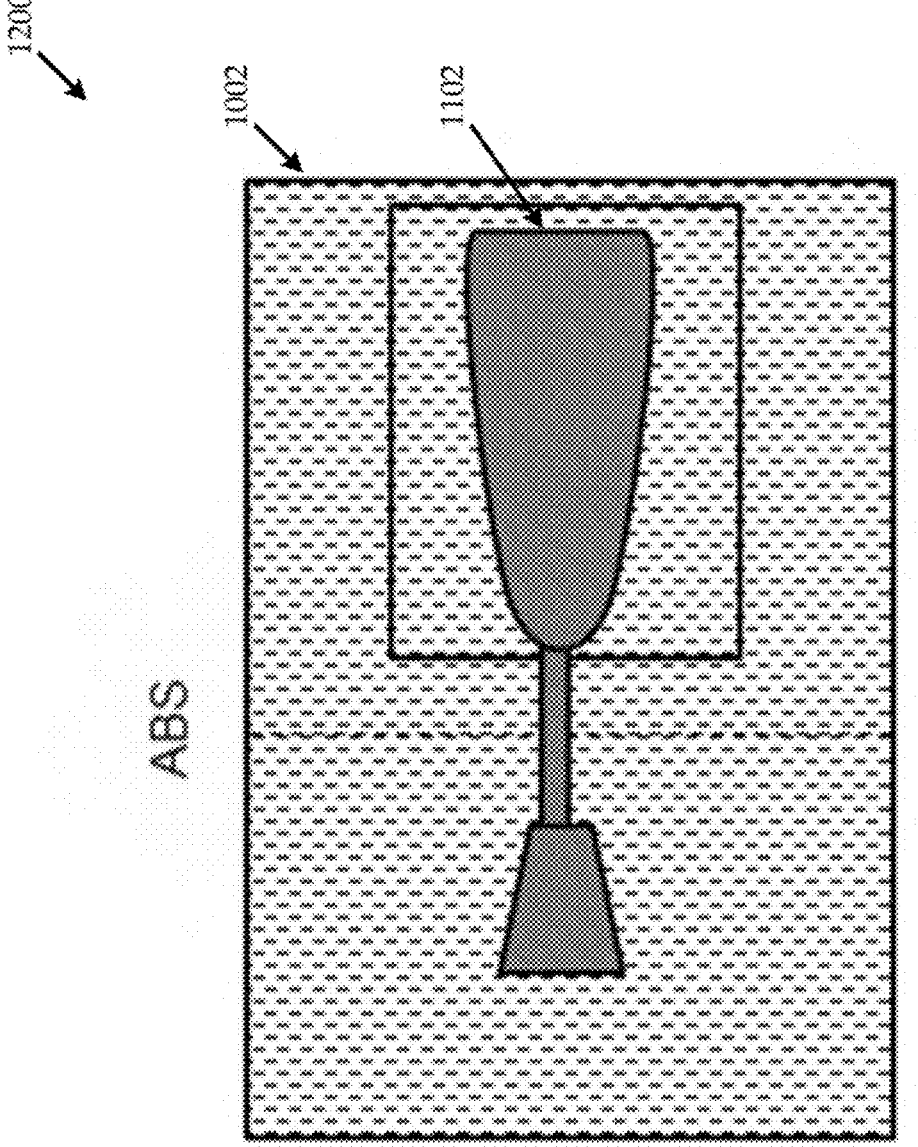
FIG. 12 is a top view of an example NFT part of a write head structure according to an embodiment.

FIG. 11 is an eighth illustration 1100 of an example NFT part of a write head structure. In FIG. 11, a peg patterning mask 1102 can be disposed above the Rh film 1002. A photolithography patterning process or carbon hard mask process can be applied and a final NFT shape can be defined by the mask 1102 design. FIG. 12 is a top view of an example NFT part of a write head structure 1200. As shown in FIG. 12, the top view can illustrate the peg mask 1102 and the Rh film 1002.

Figure 13:
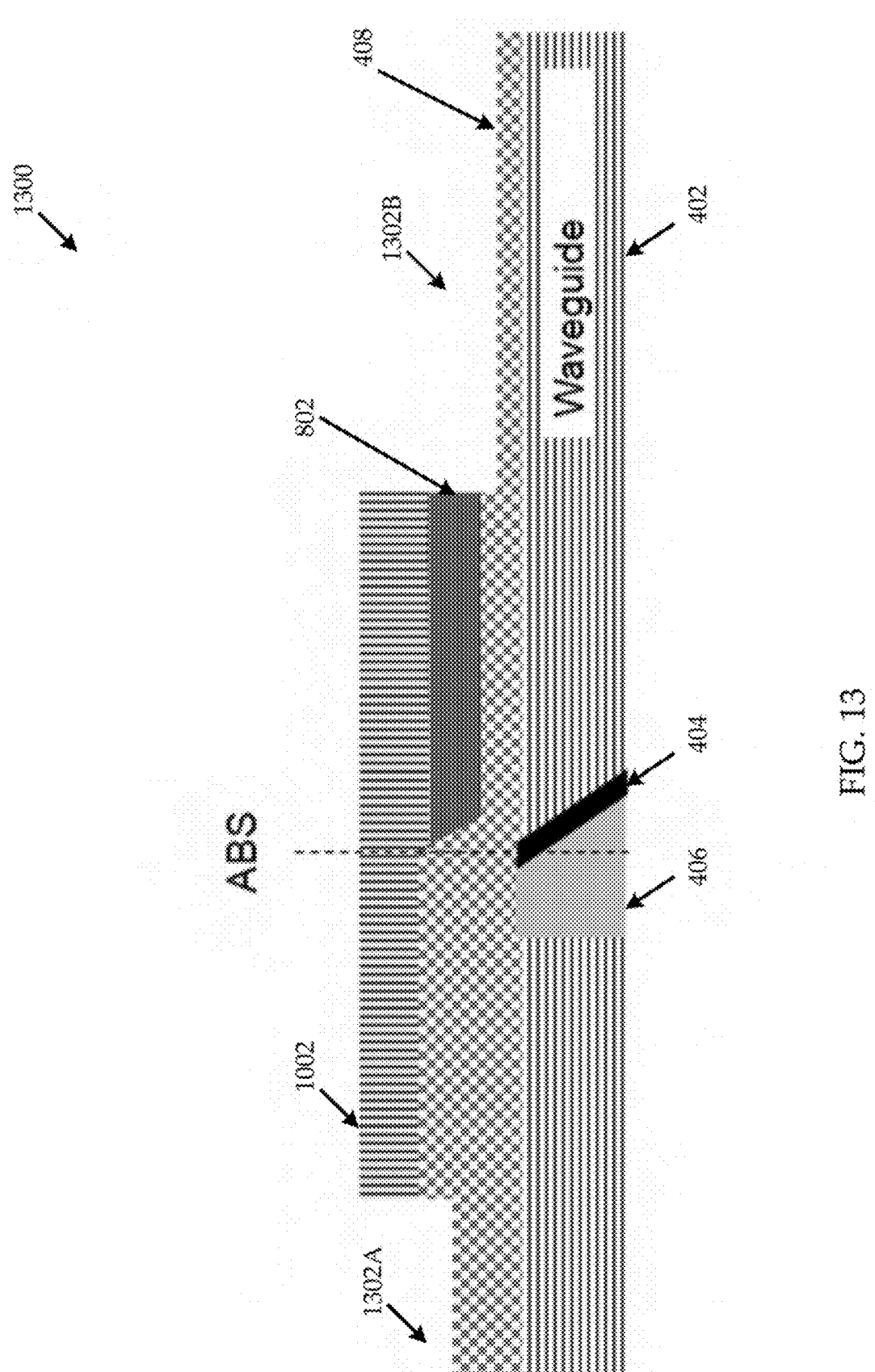
FIG. 13 is a ninth illustration of an example NFT part of a write head structure according to an embodiment.

FIG. 13 is a ninth illustration 1300 of an example NFT part of a write head structure. In FIG. 13, an etching process can be applied to remove a part of the Rh film 1002 and Au film 802 which are not protected by the mask. For example, the etching process can remove portions 1302A-B. The mask 1102 can be removed after the patterning process is completed.

Figure 14:
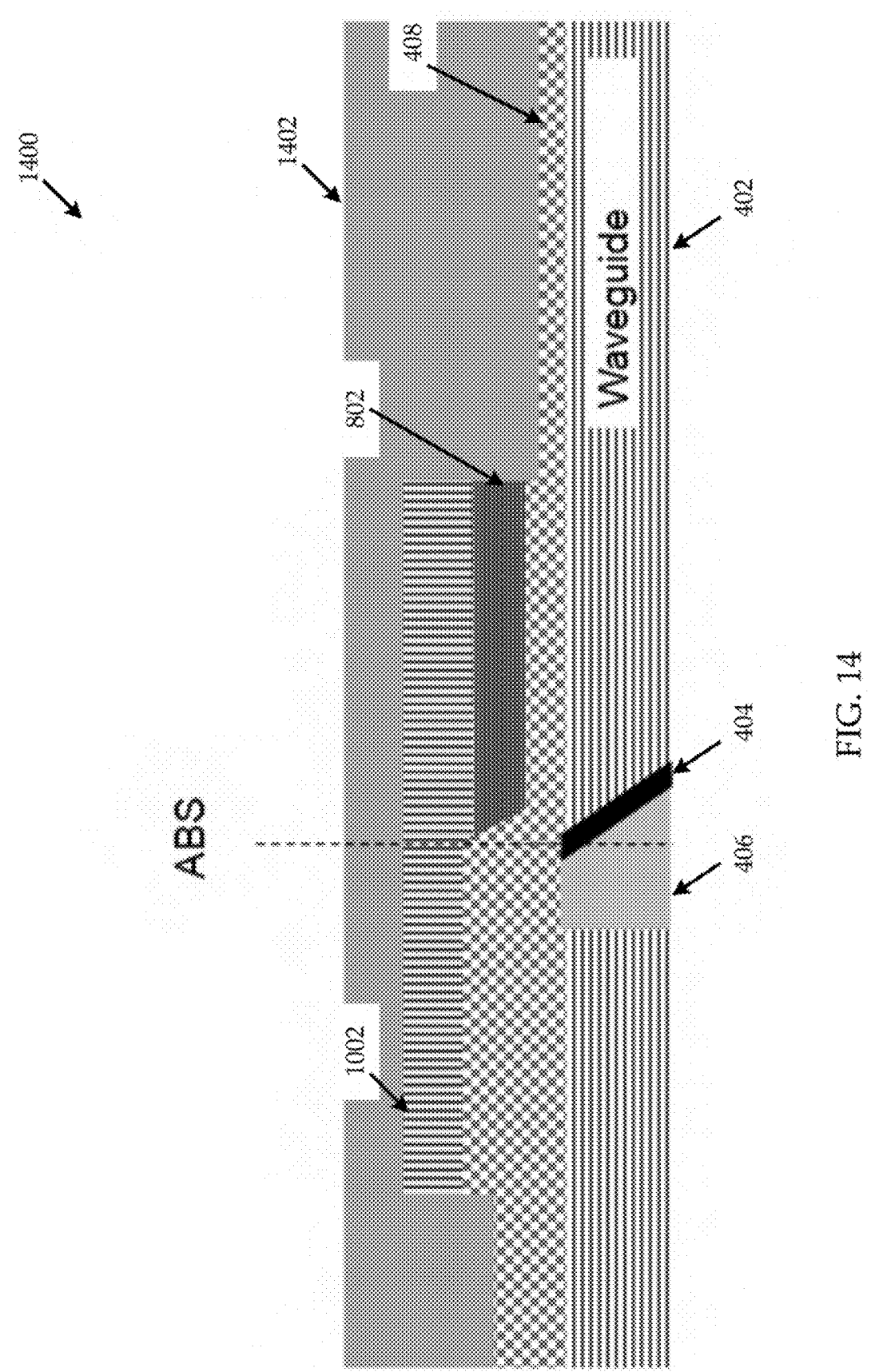
FIG. 14 is a tenth illustration of an example NFT part of a write head structure according to an embodiment.

FIG. 14 is a tenth illustration 1400 of an example NFT part of a write head structure. In FIG. 14, a PECVD $SiO_2$ layer 1402 can be deposited followed by a CMP planarization to finish the NFT fabrication process. The remaining $SiO_2$ thickness can range from 200~600 A.

Figure 15:
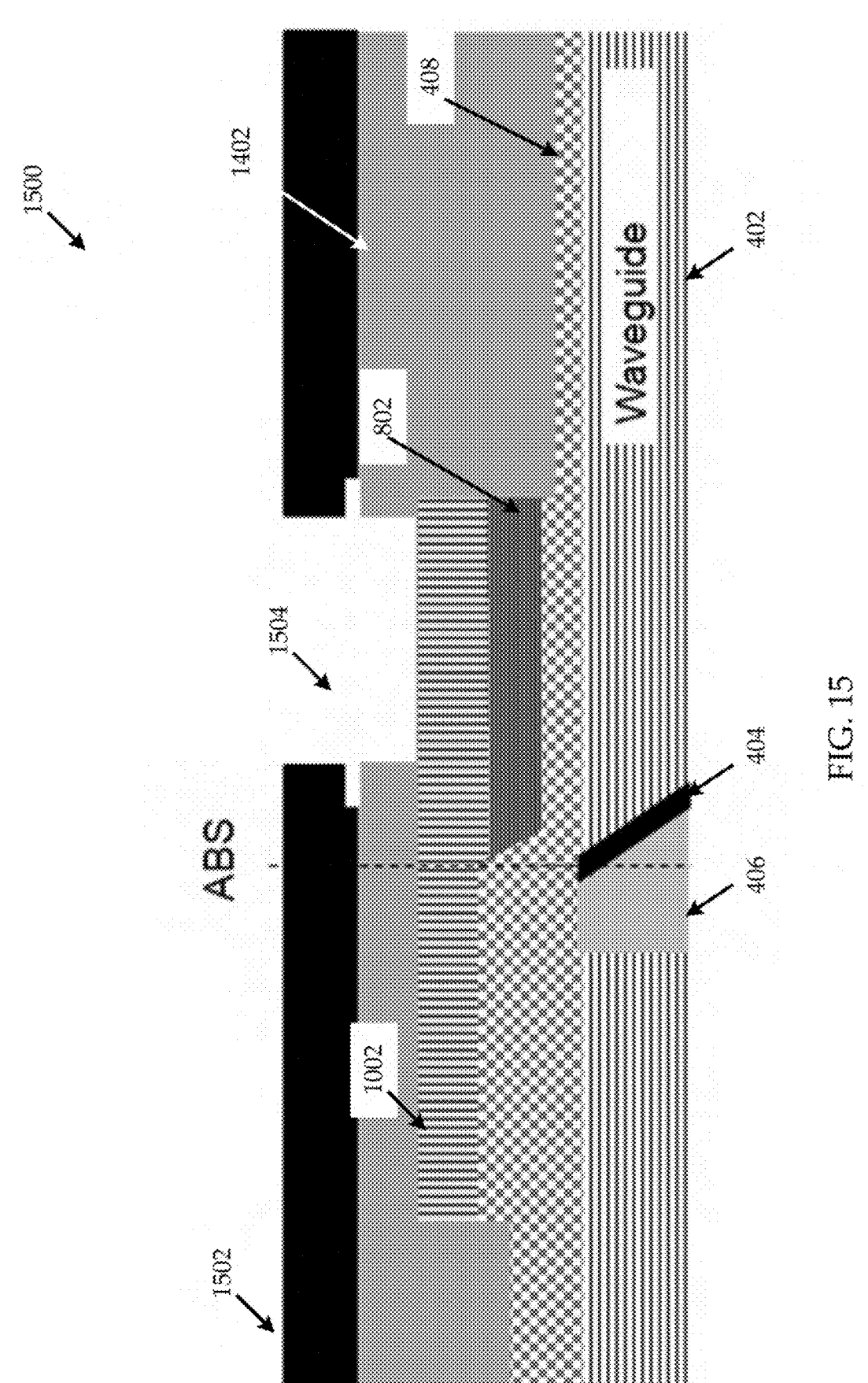
FIG. 15 is an eleventh illustration of an example NFT part of a write head structure according to an embodiment.

FIG. 15 is an eleventh illustration 1500 of an example NFT part of a write head structure. In FIG. 15, following the CMP, a photo resist 1502 is coated on top of SiO2 1402, which can define the final shape of the first Au heat sink (HS). Further, a RIE process to remove a portion 1504 of the $SiO_2$ on top of NFT.

Figure 16:
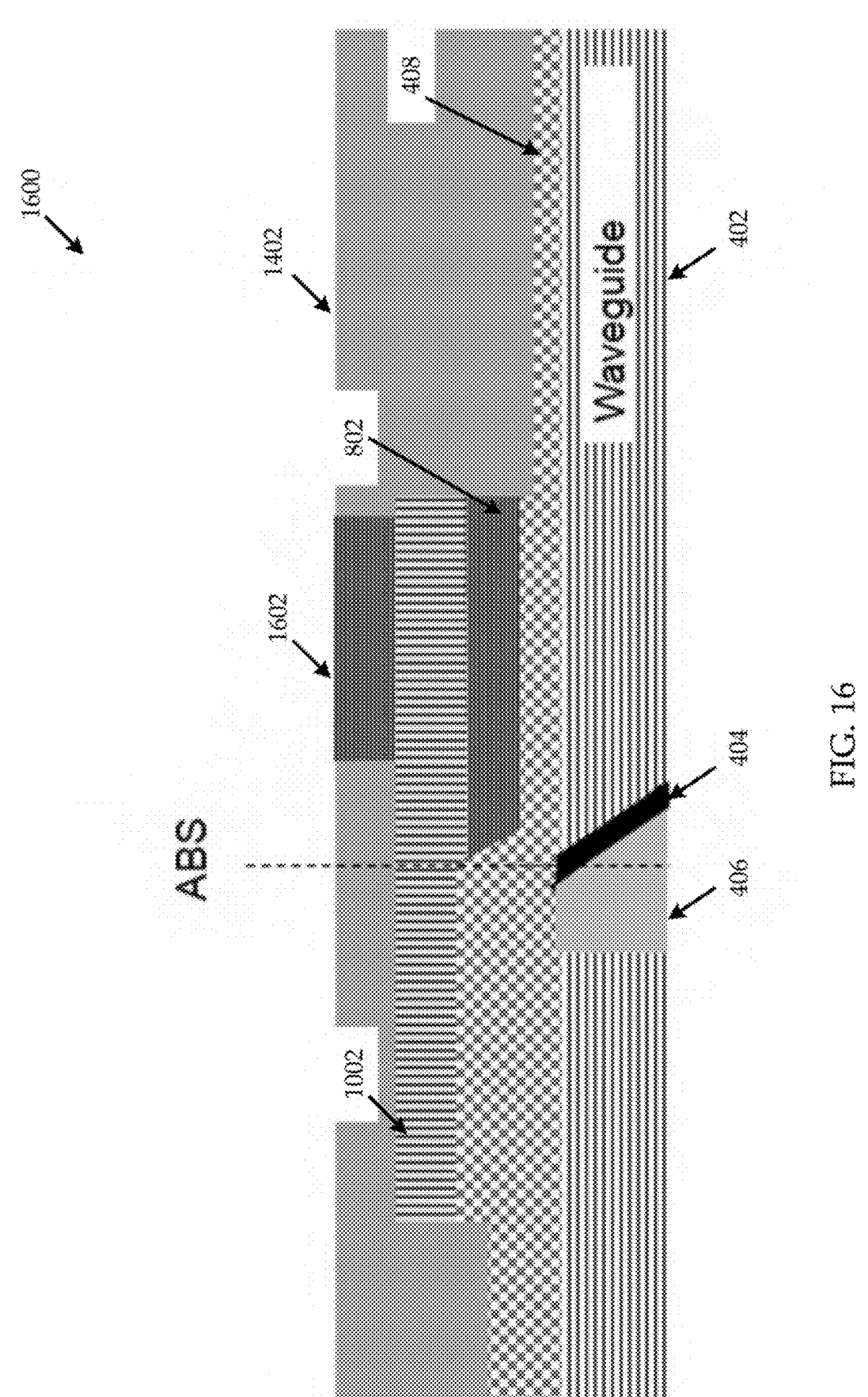
FIG. 16 is a twelfth illustration of an example NFT part of a write head structure according to an embodiment.

FIG. 16 is a twelfth illustration 1600 of an example NFT part of a write head structure. As shown in FIG. 16, a Au, Rh, or Ir layer 1602 layer can be deposited in the cavity 1504. Further, the mask 1502 can be removed as part of a resist stripping process.

Figure 17:
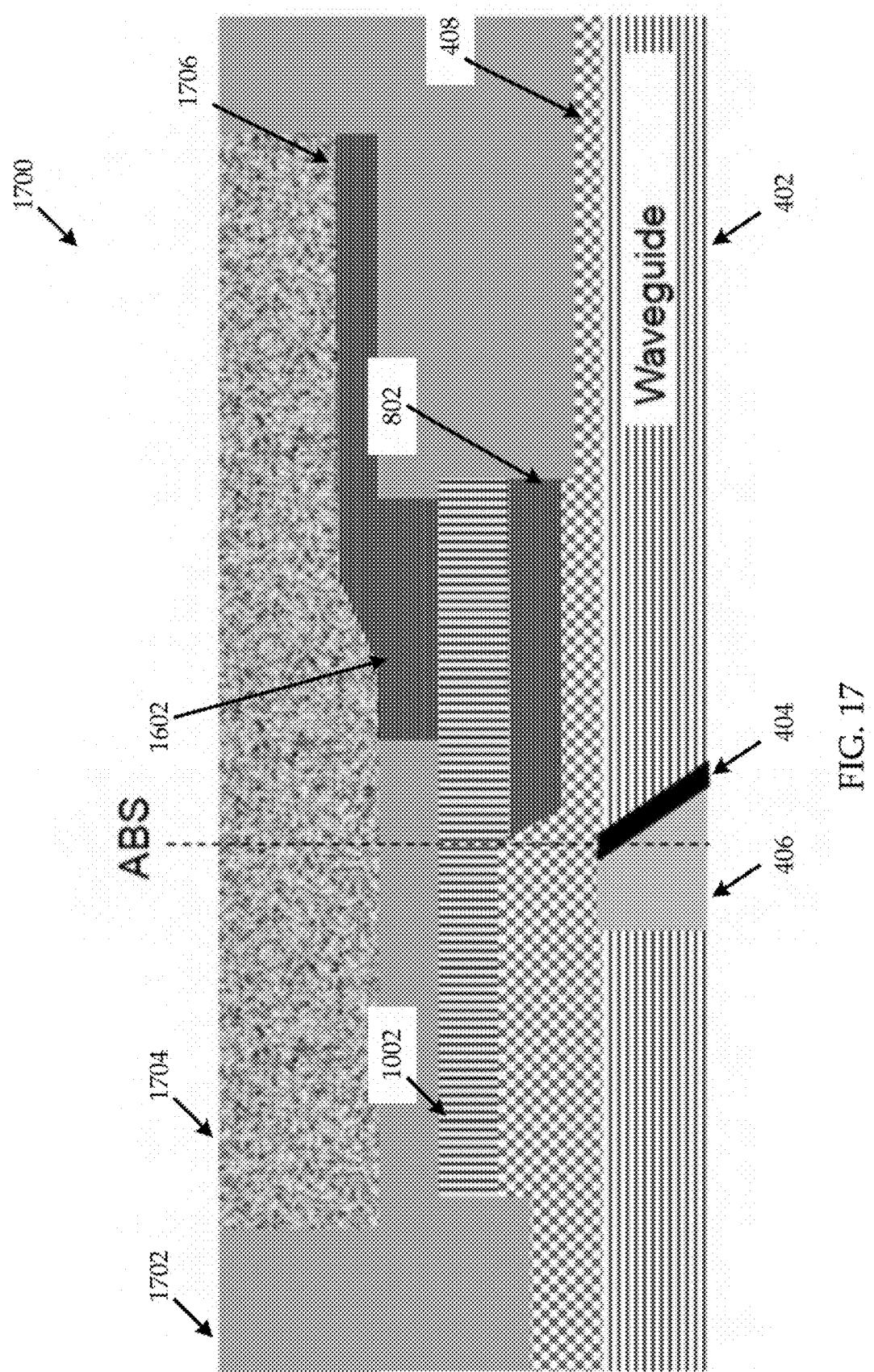
FIG. 17 is a thirteenth illustration of an example NFT part of a write head structure according to an embodiment.

FIG. 17 is a thirteenth illustration 1700 of an example NFT part of a write head structure. As shown in FIG. 17, a second Au heat sink 1702 and a main pole 1704 can be added to finish the device fabrication process.

Figure 18:
FIG. 18 is an illustration of an example write head with a stopper layer according to an embodiment.

In some instances, another option to make the taper-feature is to use reactive ion etching (RIE). This may need a stopper layer below the alumina, such as SmOx, which can be exposed to the ABS. FIG. 18 is an illustration of an example write head 1800 with a stopper layer. As shown in FIG. 18, a stopper layer 1802 can be added between alumina layer 408 and Au layer 802.

The present embodiments can combine the advantages of the bi-layer structure (robust peg material, good plasmonic material for NFT excitation) with the efficient cooling of the peg by the tapered structure. This can improve the reliability of HAMR heads without a performance or efficiency trade-off.

The present embodiments generally relate to a HAMR write head with a NFT bi-layer structure with a bottom taper, which can be applied to one or both layers of the two layers. In a first example embodiment, a heat-assisted magnetic recording (HAMR) write head is provided. The HAMR write head can include a main pole (e.g., 202) including a tip portion configured to interact with a magnetic recording medium at an air-bearing surface (ABS) (e.g., 214). The HAMR write head can further include a near-field transducer (NFT) that includes a dielectric waveguide (e.g., 222), a plasmon generator (PG) layer (e.g., 206), and a second layer (e.g., 204). The second layer can include a thermo-mechanically stable material disposed adjacent to the PG layer. Further, the PG layer (e.g., 206) and the second layer (e.g., 204) can form a taper angle relative to the ABS ranging between 30 and 60 degrees.

In some instances, the PG layer comprises gold.

In some instances, the thermo-mechanically stable material comprises any of Rhodium, Iridium, and platinum.

In some instances, the HAMR write head is formed via a manufacturing process. This process is illustrated with respect to FIGS. 4-18, for example. The manufacturing process can include depositing an alumina layer (e.g., 408) over the dielectric waveguide (e.g., 402). The process can also include adding a first photo-resist (PR) mask over a portion of the alumina layer and performing an ion beam etching (IBE) process to remove another portion of the alumina layer not covered by the first PR mask (e.g., region 502 forming a cavity in the alumina layer). The first PR mask can then be removed.

In some instances, the manufacturing process can also include depositing the PG layer (e.g., 602) over the alumina layer (e.g., 408). The process can also include removing a portion of the PG layer (e.g., portion 702) via an etching process. The process can also include depositing the second layer (e.g., 1002) over the alumina layer and a remaining portion of the PG layer (e.g., 802). The process can also include adding a second PR mask (e.g., 1102) over the second layer (e.g., 1002). The process can also include performing the etching process to remove parts of the second layer, PG layer, and the alumina layer not over the second PR mask (e.g., removed portions 1302A-B). The second PR mask can also be removed.

In some instances, the manufacturing process further comprises depositing a silicon dioxide ($SiO_2$) layer (e.g., 1402) over the second layer (e.g., 1002), PG layer (e.g., 802), and the alumina layer (e.g., 408). The process can also include coating a third PR mask (e.g., 1502) over the $SiO_2$ layer performing a reactive-ion etching (RIE) process to remove a portion of the $SiO_2$ layer not under the third PR mask (e.g., region 1504). The process can further include depositing a heat sink (e.g., 1602, 1706) and depositing the main pole (e.g., 1704).

In some instances, the manufacturing process further comprises depositing a RIE stopper layer (e.g., 1802) between the alumina layer and the PG layer. The process can also include performing a RIE process to taper the PG layer and the second layer.

In another example embodiment, a method for manufacturing a heat-assisted magnetic recording (HAMR) write head is provided. The method can include forming a near-field transducer (NFT) by depositing a plasmon generator (PG) layer over an alumina layer that is disposed adjacent to a dielectric waveguide. Forming the NFT can also include depositing a second layer comprising a thermo-mechanically stable material above the PG layer. The PG layer and the second layer can form a taper angle relative to an air-bearing surface (ABS) ranging between 30 and 60 degrees. The method can also include depositing a heat sink above the NFT. The method can also include depositing a main pole adjacent to the heat sink.

In some instances, the PG layer comprises gold.

In some instances, the thermo-mechanically stable material comprises any of Rhodium, Iridium, and platinum.

In some instances, the method can also include depositing the alumina layer over the dielectric waveguide, adding a first photo-resist (PR) mask over a portion of the alumina layer, performing an ion beam etching (IBE) process to remove another portion of the alumina layer not covered by the first PR mask, and removing the first PR mask.

In some instances, the method can also include removing a portion of the PG layer via an etching process, adding a second PR mask over the second layer, performing the etching process to remove parts of the second layer, PG layer, and the alumina layer not over the second PR mask, and removing the second PR mask.

In some instances, the method can also include depositing a silicon dioxide ($SiO_2$) layer over the second layer, PG layer, and the alumina layer, coating a third PR mask over the SiO$_2$ layer, and performing a reactive-ion etching (RIE) process to remove a portion of the SiO$_2$ layer not under the third PR mask.

In some instances, the method can also include depositing a RIE stopper layer between the alumina layer and the PG layer, and performing a RIE process to taper the PG layer and the second layer.

In another example embodiment, a device is provided. The device can include a main pole, a heat sink disposed adjacent to the main pole, and a dielectric waveguide. The device can also include a plasmon generator (PG) layer comprising gold and a second layer comprising a thermo-mechanically stable material disposed above the plasmon generator layer. The thermo-mechanically stable material can include any of: Rhodium, Iridium, and Platinum. Further, any of the plasmon generator and the second layer can form a taper angle relative to an air-bearing surface (ABS) ranging between 30 and 60 degrees.

In some instances, the second layer comprises a peg region adjacent to the ABS with a thickness of the peg region of around 25 nanometers.

In some instances, the device can include an alumina layer disposed between the PG layer and the dielectric waveguide.

In some instances, the device is formed via a manufacturing process comprising adding a first photo-resist (PR) mask over a portion of the alumina layer, performing an ion beam etching (IBE) process to remove another portion of the alumina layer not covered by the first PR mask, and removing the first PR mask.

In some instances, the manufacturing process further comprises depositing the PG layer over the alumina layer, removing a portion of the PG layer via an etching process, depositing the second layer over the alumina layer and a remaining portion of the PG layer, adding a second PR mask over the second layer, performing the etching process to remove parts of the second layer, PG layer, and the alumina layer not over the second PR mask, and removing the second PR mask.

In some instances, the manufacturing process further comprises depositing a silicon dioxide (SiO$_2$) layer over the second layer, PG layer, and the alumina layer, coating a third PR mask over the SiO$_2$ layer, performing a reactive-ion etching (RIE) process to remove a portion of the SiO$_2$ layer not under the third PR mask, depositing the heat sink, and depositing the main pole.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A method for manufacturing a heat-assisted magnetic recording (HAMR) write head, the method comprising:
   forming a near-field transducer (NFT) by:
      providing an alumina layer adjacent to a dielectric waveguide;
      depositing a plasmon generator (PG) layer over the alumina layer that is disposed adjacent to a dielectric waveguide; and
      depositing a second layer over both the PG layer and the alumina layer such that a bottom surface of the second layer contacts both the PG layer and the alumina layer, wherein a length of the second layer is greater than a length of the PG layer; and
   depositing a main pole adjacent to a heat sink.

2. The method of claim 1, wherein the PG layer comprises gold, and wherein the PG layer and the second layer form a taper angle relative to an air-bearing surface (ABS) ranging between 30 and 60 degrees.

3. The method of claim 1, wherein the second layer comprises a thermo-mechanically stable material that includes any of Rhodium, Iridium, and platinum.

4. The method of claim 1, further comprising:
   depositing the alumina layer over the dielectric waveguide;
   adding a first photo-resist (PR) mask over a portion of the alumina layer;
   performing an ion beam etching (IBE) process to remove another portion of the alumina layer not covered by the first PR mask; and
   removing the first PR mask.

5. The method of claim 4, further comprising:
   removing a portion of the PG layer via an etching process;
   adding a second PR mask over the second layer;
   performing the etching process to remove parts of the second layer, PG layer, and the alumina layer not over the second PR mask; and
   removing the second PR mask.

6. The method of claim 5, further comprising:
   depositing a silicon dioxide (SiO$_2$) layer over the second layer, PG layer, and the alumina layer;
   coating a third PR mask over the SiO$_2$ layer; and
   performing an reactive-ion etching (RIE) process to remove a portion of the SiO$_2$ layer not under the third PR mask.

7. The method of claim 1, further comprising:
   depositing a RIE stopper layer between the alumina layer and the PG layer; and
   performing a RIE process to taper the PG layer and the second layer.

8. A method comprising:
   disposing an alumina layer over the dielectric waveguide;
   depositing a plasmon generator (PG) layer over the alumina layer that is disposed adjacent to a dielectric waveguide; and
   depositing a second layer over both the PG layer and the alumina layer such that a bottom surface of the second layer contacts both the PG layer and the alumina layer, wherein a length of the second layer is greater than a length of the PG layer.

9. The method of claim 8, wherein the second layer comprises thermo-mechanically stable material comprising any of: Rhodium, Iridium, and Platinum, and wherein any of the PG layer and the second layer form a taper angle relative to an air-bearing surface (ABS) ranging between 30 and 60 degrees.

10. The method of claim 8, wherein the second layer comprises a peg region adjacent to the ABS with a thickness of the peg region of around 25 nanometers.

11. The method of claim 8, further comprising:

adding a first photo-resist (PR) mask over a portion of the alumina layer;

performing an ion beam etching (IBE) process to remove another portion of the alumina layer not covered by the first PR mask; and removing the first PR mask.

12. The method of claim 8, further comprising:

removing a portion of the PG layer via an etching process;

depositing the second layer over the alumina layer and a remaining portion of the PG layer;

adding a second PR mask over the second layer;

performing the etching process to remove parts of the second layer, PG layer, and the alumina layer not over the second PR mask; and removing the second PR mask.

13. The method of claim 8, further comprising:

depositing a silicon dioxide ($SiO_2$) layer over the second layer, PG layer, and the alumina layer;

coating a third PR mask over the $SiO_2$ layer;

performing an reactive-ion etching (RIE) process to remove a portion of the $SiO_2$ layer not under the third PR mask;

depositing a heat sink; and depositing a main pole.

* * * * *